HENRY GALENTINE.
Improvement in Plow Wheels.
No. 120,581. Patented Nov. 7, 1871.
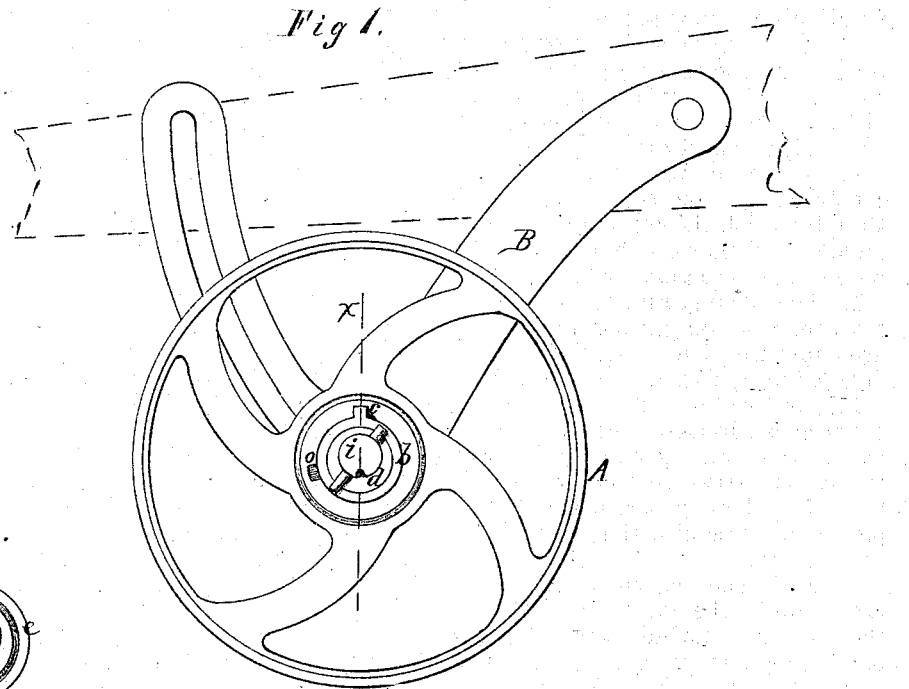
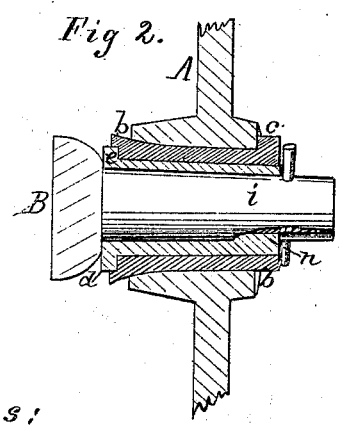
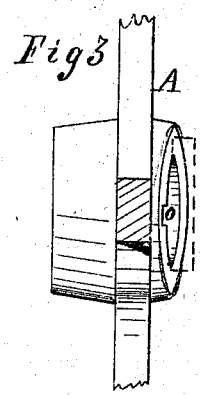
Witnesses:
J. Chase
A. H. Sargent
Inventor:
H. Galentine
By Coughborough & Clement
Attys

UNITED STATES PATENT OFFICE.

HENRY GALENTINE, OF GREECE, NEW YORK.

IMPROVEMENT IN PLOW-WHEELS.

Specification forming part of Letters Patent No. 120,581, dated November 7, 1871.

*To all whom it may concern:*

Be it known that I, HENRY GALENTINE, of Greece, in the county of Monroe and State of New York, have invented certain Improvements in Plow-Wheels and Hangers, of which the following is a specification:

My invention relates to a novel method of constructing a plow-wheel and its supporting-stud, by which the bearing parts may be cheaply replaced when worn out instead of renewing both wheel and hanger, as is the usual practice.

In the drawing, Figure 1 is a side elevation of a wheel and hanger constructed according to my improved plan. Fig. 2 is a section at the dotted line $x$, Fig. 1. Figs. 3 and 4 are details.

A good deal of difficulty has heretofore been experienced in using the gauge-wheel of plows by reason of its becoming worn in the bearing to such an extent as to allow the wheel to "wabble," and thereby seriously inconvenience the plowman, or require the renewal of both wheel and hanger.

In my invention the wheel A and hanger B are made in the usual form, except as regards the bearing. The hub of the wheel and the opening through it are considerably larger than is customary, and a bushing, $b$, is fitted into the latter. This bushing is somewhat conical in form, and is provided at the smaller end with a lug, $c$, Figs. 1 and 2, projecting from its outer periphery, which, when the bushing is placed in the wheel, passes through a slot, $o$, Figs. 1 and 3, provided in the hub of the latter. The outer face of the wheel-hub is somewhat inclined to the axial line, as indicated in Fig. 3, and the slot $o$ is formed through the hub at the point of least depth, as shown. Thus, when the bushing is placed in the hub in the manner described and given a partial turn, the lug $c$, bearing against the inclined face, locks the bushing, by means of its conical shape, into the wheel. A sleeve, $d$, is provided upon the hanger-stud $i$, and is prevented from revolving thereon by a spline, $n$, Figs. 2 and 4, resting in a groove in the stud, as shown in Figs. 1 and 2. The bushing $b$ revolves easily upon the sleeve $d$, and the outer and inner surfaces of these two parts, respectively, constitute the bearing for the wheel. A slight flange or rim, $e$, is provided upon the inner end of $d$, which enters a recess in the bushing, as indicated in Fig. 2, and prevents the latter and the wheel from sliding back against the hanger. The sleeve and bushing, and, consequently, the wheel, are held upon the stud $i$ by a pin or a nut and washer, in any usual or convenient manner.

It will be observed that the whole wear of the wheel-bearing occurs upon the bushing $b$ and sleeve $d$, which may be very readily and cheaply replaced when they become useless, retaining the same wheel and hanger. Moreover, in the old construction the wheel revolved directly upon the stud, and the dirt dropping upon the latter worked into the bearing and soon ground it out. In my device the surface of the sleeve $d$ is not exposed in this manner, since it does not project beyond the end of the bushing $b$; and the durability of the bearing is thereby increased.

The parts of this device may be put together without mechanical fitting further than drilling the hole for the retaining-pin; and its original cost is scarcely greater than the old construction, while the wearing parts may be renewed at a fraction of the cost of the wheel and hanger.

It will be seen, also, that my invention is equally applicable to the wheels of cultivators and other agricultural implements exposed to the action of grit and dirt, as well as to many other devices of a similar character, where it is expensive to renew the parts. Practically I find it desirable to thicken the sleeve $d$ upon the lower side, the point of greatest wear.

What I claim as my invention is—

1. In combination with the wheel A, the bushing $b$ secured in the former by means of the lug $c$ locking against the inclined face of the wheel-hub, substantially in the manner set forth.

2. A wheel and hanger combining in their construction the following instrumentalities, viz.; The tapering bushing $b$ secured in the wheel substantially as set forth, and the sleeve $d$ detachable from the fixed stud $i$ and prevented from revolving thereon, for the purposes set forth.

HENRY GALENTINE.

Witnesses:
F. H. CLEMENT,
A. H. SARGENT.

(114)